United States Patent
Kim et al.

(10) Patent No.: US 10,397,890 B2
(45) Date of Patent: Aug. 27, 2019

(54) NODE UNIT CAPABLE OF MEASURING AND COMPENSATING TRANSMISSION DELAY AND DISTRIBUTED ANTENNA SYSTEM INCLUDING THE SAME

(71) Applicant: SOLiD, INC., Seongnam-si, Gyeonggi-do (KR)

(72) Inventors: Doyoon Kim, Bucheon-si (KR); Hyoungho Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 225 days.

(21) Appl. No.: 15/540,651

(22) PCT Filed: Dec. 31, 2014

(86) PCT No.: PCT/KR2014/013102
§ 371 (c)(1),
(2) Date: Sep. 5, 2017

(87) PCT Pub. No.: WO2016/108311
PCT Pub. Date: Jul. 7, 2016

(65) Prior Publication Data
US 2017/0367061 A1    Dec. 21, 2017

(30) Foreign Application Priority Data
Dec. 30, 2014   (KR) .................. 10-2014-0194361

(51) Int. Cl.
*H04W 56/00* (2009.01)
*H04B 17/10* (2015.01)
(Continued)

(52) U.S. Cl.
CPC .......... *H04W 56/005* (2013.01); *H04B 17/10* (2015.01); *H04B 17/104* (2015.01);
(Continued)

(58) Field of Classification Search
CPC ...... H04B 17/10; H04B 17/104; H04B 17/14; H04L 7/0041; H04W 56/005; H04W 56/007; H04W 88/085
See application file for complete search history.

(56) References Cited

U.S. PATENT DOCUMENTS

| | | |
|---|---|---|
| 7,948,897 B2 | 5/2011 | Stuart et al. |
| 8,743,718 B2 | 6/2014 | Grenier et al. |
| 2014/0162713 A1 | 6/2014 | Stapleton et al. |

FOREIGN PATENT DOCUMENTS

KR    10-2014-0051244 A    4/2014

OTHER PUBLICATIONS

International Search Report of PCT/KR2014/013102, dated Sep. 11, 2015. [PCT/ISA/210].

*Primary Examiner* — Asad M Nawaz
*Assistant Examiner* — Saad A. Waqas
(74) *Attorney, Agent, or Firm* — Sughrue Mion, PLLC

(57) ABSTRACT

Provided is a node unit which is branch-connected to another communication node via a transport medium, the node unit comprising: a delay measurement unit which transmits a test signal for measuring a delay to an adjacent node unit of the branch-connected upper stage via the transport medium and detects a loopback signal to which the test signal is looped back via the adjacent node unit of the upper stage, thereby measuring an upper stage transmission delay between the adjacent node unit of the upper stage and the node unit; a delay summation unit which, when an adjacent node unit of the branch-connected lower stage exists, receives a lower stage transmission delay transmitted from the adjacent node unit of the lower stage, and calculates a summed transmission delay by summing the upper stage transmission delay and the lower stage transmission delay; and a control unit which transmits the summed
(Continued)

transmission delay to the adjacent node unit of the upper stage.

16 Claims, 6 Drawing Sheets

(51) Int. Cl.
    *H04B 17/14*          (2015.01)
    *H04L 7/00*           (2006.01)
    *H04W 88/08*         (2009.01)

(52) U.S. Cl.
    CPC ............ *H04B 17/14* (2015.01); *H04L 7/0041* (2013.01); *H04W 56/007* (2013.01); *H04W 88/085* (2013.01)

NODE UNIT CAPABLE OF MEASURING AND COMPENSATING TRANSMISSION DELAY AND DISTRIBUTED ANTENNA SYSTEM INCLUDING THE SAME

CROSS-REFERENCE TO RELATED APPLICATIONS

This application is a National Stage of International Application No. PCT/KR2014/013102, filed Dec. 31, 2014, and claims priority from Korean Patent Application No. 10-2014-0194361, filed Dec. 30, 2014, the contents of which are incorporated herein by reference in their entireties.

BACKGROUND

1. Field

The present invention relates to transmission delay measurement and compensation, and more particularly, to a node unit capable of measuring and compensating for a transmission delay, a method for measuring and compensating for a transmission delay, and a distributed antenna system including the same.

2. Description of the Related Art

A distributed transmission system for a mobile communication signals, such as a distributed antenna system, a base station distributed system, or the like, requires delay equalization in a distributed remote device, for example, a remote unit in the distributed antenna system or a remote radio head (RRH) in the base station distributed system.

Such delay equalization is significant in a signal transmission system based on orthogonal frequency division multiplexing, in particular, such as long term evolution (LTE) or wireless broadband Internet (WIBRO). This is because it is required that mobile communication services using the distributed remote device will be carried out in the same time.

Thus, the signal distributed transmission system requires precise measurement of a transmission delay and precise delay compensation based on the measured transmission delay as a premise for delay equalization for improving the quality of the mobile communication services.

SUMMARY

The present invention is directed to providing a node unit capable of measuring and compensating for a transmission delay, a method for measuring and compensating for a transmission delay, and a distributed antenna system including the same.

According to an aspect of the present invention, there is provided a node unit which is branch-connected to another communication node via a transport medium, the node unit includes a delay measurement unit which transmits a test signal for measuring a delay to an adjacent node unit of the branch-connected upper stage via the transport medium and detects a loop back signal to which the test signal is looped back via the adjacent node unit of the upper stage, thereby measuring an upper stage transmission delay between the adjacent node unit of the upper stage and the node unit; a delay summation unit which, when an adjacent node unit of the branch-connected lower stage exists, receives a lower stage transmission delay transmitted from the adjacent node unit of the lower stage, and calculates a summed transmission delay by summing the upper stage transmission delay and the lower stage transmission delay; and a control unit which transmits the summed transmission delay to the adjacent node unit of the upper stage.

According to an embodiment, when the adjacent node unit of the lower stage is a node unit that constitutes an end point within a same branch, the lower stage transmission delay received from the adjacent node unit of the lower stage may be a transmission delay between the adjacent node unit of the lower stage and the node unit.

According to an embodiment, when at least one lower stage adjacent node branch-connected to the adjacent node unit of the lower stage exists, the lower stage transmission delay received from the adjacent node unit of the lower stage may be a delay in which a transmission delay between the adjacent node unit of the lower stage and the node unit and a transmission delay from the adjacent node unit of the lower stage to an end point node of the at least one lower stage adjacent node are summed.

According to an embodiment, the node unit may be a node unit branch-connected to a headend unit, wherein the headend unit constitutes a distributed antenna system and constitutes a start point for interfacing mobile communication service signals between a base station and the node unit.

According to an embodiment, the node unit may further include, when the distributed antenna system is a digital signal distributed system in which the mobile communication service signals are digitally transmitted between nodes via the transport medium, a framer/deframer of the upper stage disposed on a signal transmission path with an adjacent node of the upper stage, and the delay measurement unit may be disposed at a rear end of the framer/deframer of the upper stage on a loop back path with the adjacent node of the upper stage, transmit the test signal to the adjacent node of the upper stage via the framer of the upper stage, and detect the loop back signal with respect to the test signal transmitted via the deframer of the upper stage.

According to an embodiment, the lower stage transmission delay may be transmitted from the adjacent node unit of the lower stage via one among a control & management (C&M) channel, an uplink overhead channel, and an uplink frame field of a mobile communication signal of the distributed antenna system.

According to an embodiment, the node unit may further include a delay compensation unit performing delay compensation for equalizing a transmission delay of the entire system in correspondence to a node distribution environment according to the distributed antenna system, wherein the control unit may calculate a compensation value for equalization of the transmission delay by referring to the transmission delay of the lower stage transmitted from the adjacent node unit of the lower stage and transmit the calculated compensation value to the delay compensation unit.

According to an embodiment, the control unit may receive delay deviation information transmitted from the headend unit of the distributed antenna system, calculate a compensation value for equalization of the transmission delay by referring to the delay deviation information, and transmit the calculated compensation value to the delay compensation unit.

According to an embodiment, the control unit may sum the delay deviation information and the transmission delay of the lower stage to calculate a compensation value for equalization of the transmission delay and transmit the calculated compensation value to the delay compensation unit.

According to an embodiment, the delay deviation information transmitted from the headend unit may be deviation information corresponding to a difference between a maximum transmission delay in the entire node distribution environment of the distributed antenna system and a maximum transmission delay in a branch including the corresponding node unit.

According to an embodiment, the delay deviation information may be transmitted from the headend unit via one among a C&M channel, an uplink overhead channel, and a downlink frame field of a mobile communication signal of the distributed antenna system.

According to an embodiment, the control unit may receive a delay measurement start signal from a network management system connected to the headend unit or the distributed antenna system via a network and control the node unit to start transmission delay measurement using the delay measurement unit according to the received delay measurement start signal.

According to another aspect of the present invention, there is provided a distributed antenna system includes a plurality of node units connected, wherein each of the plurality of node units is implemented as the above described node unit.

According to embodiments of the present invention, a signal transmission system in which communication nodes for providing mobile communication services are branch-connected to each other, can measure a transmission delay automatically.

In addition, according to embodiments of the present invention, the signal transmission system can perform delay compensation in consideration of a transmission delay measured via a transport medium so that the quality of the mobile communication services can be improved in case of signal transmission based on orthogonal frequency division multiplexing, such as long term evolution (LTE) or wireless broadband Internet (WIBRO) in which it is particularly significant to synchronize service times of mobile communication signals.

DETAILED DESCRIPTION OF EXEMPLARY EMBODIMENTS

Figure 1:
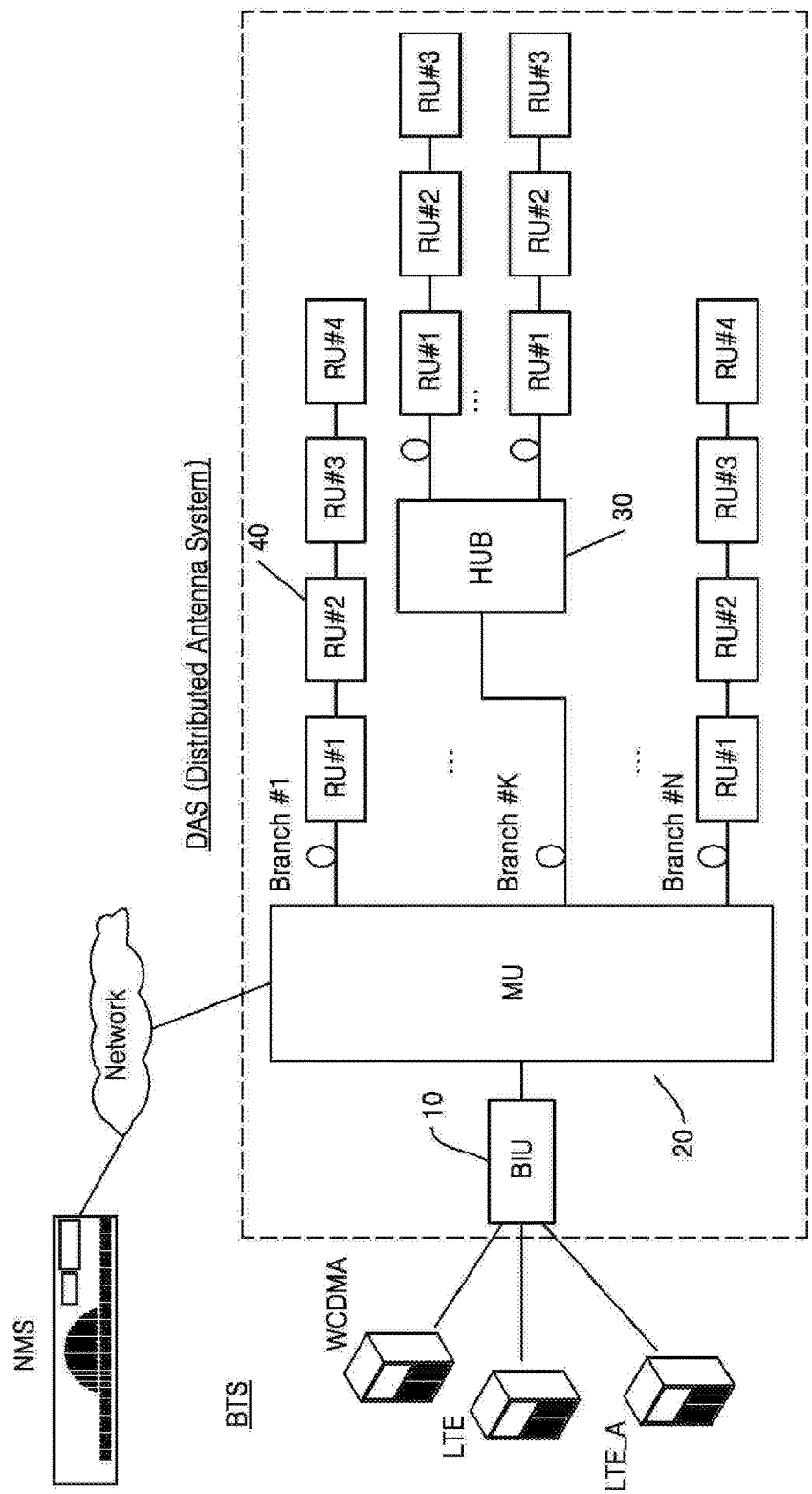
FIG. 1 is a view of an example of topology of a distributed antenna system as one type of a signal distributed transmission system to which the present invention may be applied.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

In the description of the present invention, certain detailed explanations of related art are omitted when it is deemed that they may unnecessarily obscure the essence of the invention. In addition, numbers (for example, first, second, etc.) used during describing of the present specification are just identification symbols for distinguishing one component from another.

In addition, it will be understood that when an element is referred to as being "connected to" or "coupled to" another element, the element can be directly connected to or directly coupled to another element or intervening elements, unless specially otherwise defined.

In addition, the terms such as "~unit", "~or", "~er", "~module", etc., used herein represent a unit for processing at least one function or operation and may be implemented with hardware or software or a combination of the hardware and the software.

It will be clarified that classification of components in the present specification is just for classification of the components according to main functions thereof. That is, two or more components that will be described later may be combined as one component, or one component may be divided into two or more components according to subdivided functions thereof. Each of the components that will be described later may perform additionally a part or the whole of functions of another component in addition to main functions thereof, and another component may also be exclusively responsible for a part of the main functions of each component.

Hereinafter, embodiments of the present invention will be described in detail with reference to the attached drawings.

Hereinafter, a distributed antenna system will be described as an application example to which a method for measuring and compensating for a transmission delay according to an embodiment of the present invention may be applied. However, the embodiments of the present invention may be applied to another signal distributed transmission system, such as a base station distributed system, in the same or similar way in addition to the distributed antenna system. In addition, hereinafter, a remote unit disposed within the distributed antenna system will be described as an example of a communication node to which the method for measuring and compensating for the transmission delay according to an embodiment of the present invention is applied. However, a hub unit within the distributed antenna system may correspond thereto, and in case of base station distribution, a remote radio head (RRH) may also correspond thereto.

FIG. 1 is a view of an example of topology of a distributed antenna system as one type of a signal distributed transmission system to which the present invention may be applied.

Referring to FIG. 1, a distributed antenna system (DAS) includes a base station interface unit (BIU) 10 and a main unit (MU) 20 that constitute a headend node of the DAS, a hub unit (HUB) 30 that is an extension node, and a plurality of remote units (RUs) 40 disposed in remote service area. The DAS may be implemented with an analog DAS or digital DAS. In some cases, the DAS may also be implemented with a mixed type thereof (in other words, a part of nodes performs analog processing, and the other nodes perform digital processing).

However, FIG. 1 is a view of an example of topology of the DAS, and topology of the DAS may be modified in various ways in consideration of distinct characteristics of an installation area and an applied field (for example, an in-building, a subway, a hospital, a stadium, etc.). In such a purpose, the number of BIU 10, MU 20, HUB 30, and RUs 40 and a connection relationship between upper and lower stages therebetween may be different from those of FIG. 1. Also, in the DAS, the HUB 30 is utilized when the number of branches to be branched in a star structure from the MU 20 is limited compared to the number of RUs 40 required to be installed. Thus, when the number of RUs 40 required to be installed is sufficient only using a single MU 20 or a plurality of MUs 20 are installed, the HUB 30 may also be omitted.

Hereinafter, nodes in the DAS that may be applied to the present invention, and functions thereof will be sequentially described based on topology of FIG. 1.

The BIU 10 functions as an interface between a base station transceiver system (BTS), such as a base station, and the MU 20 within the DAS. Although FIG. 1 illustrates the case where a plurality of BTSs are connected to a single BIU 10, the BIU 10 may also be separately provided according to a business provider, a frequency band, or a sector.

In general, since radio frequency (RF) signals transmitted from the BTS are signals with high power, the BIU 10 performs a function of converting the RF signals with high power into signals with appropriate power to be processed by the MU 20 and transmitting the converted signals with appropriate power to the MU 20. Also, the BIU 10 may perform a function of receiving signals of a mobile communication service according to a frequency band (or a business provider, a sector), combining the received signals and then transmitting the combined signals to the MU 20, as illustrated in FIG. 1, according to an implementation method.

If the BIU 10 reduces the high-power signals of the BTS into low-power signals and then combines mobile communication service signals and transmits the combined signals to the MU 20, the MU 20 performs a function of distributing the combined and transmitted mobile communication service signals (hereinafter, referred to as relay signals) according to branches. In this case, when the DAS is implemented with a digital DAS, the BIU 10 may include a unit for converting the high-power RF signals of the BTS into low-power RF signals, and a unit for converting the low-power RF signals into Intermediate frequency (IF) signals, performing digital signal processing on the IF signals and then combining them. Unlike this, if the BIU 10 performs only a function of reducing the high-power signals of the BTS into low-power signals, the MU 20 may perform a function of combining the transmitted relay signals and distributing them according to branches.

As described above, the combined relay signals distributed from the MU 20 are transmitted to the RUs 40 via the HUB 30 or are transmitted directly to the RUs 40 according to branches (see Branch #1, . . . Branch #k, . . . and Branch #N of FIG. 1), and each of the RUs 40 separates the transmitted and combined relay signals according to frequency bands and performs signal processing (in case of an analog DAS, analog signal processing, and in case of a digital DAS, digital signal processing) on the relay signals. Thus, each RU 40 transmits the relay signals to a user terminal in its own service coverage via a service antenna. In this case, a specific function configuration of each RU 40 will be described in detail with reference to FIG. 2.

In FIG. 1, the BTS and the BIU 10, and the BIU 10 and the MU 20 are respectively connected to each other via a RF cable, and from the MU 20 to a lower stage thereof is connected to each other via an optical cable. However, a signal transport medium between nodes may be modified in various ways. In an example, the BIU 10 and the MU 20 may be connected to each other via the RF cable or may also be connected to each other via the optical cable or the digital interface. In another example, the MU 20 and the HUB 30, and the RUs 40 directly connected to the MU 20 are connected to each other via the optical cable, and the RUs 40 that are cascade-connected to each other may be connected via the RF cable, a twist cable, or an unshielded twisted pair (UTP) cable. In another example, the RUs 40 directly connected to the MU 20 may be connected via the RF cable, the twist cable, or the UTP cable.

However, hereinafter, this will be described based on FIG. 1. Thus, in the current embodiment, all of the MU 20, the HUB 30, and the RU 40 may include an optical transceiver module for electrical-to-optical/optical-to-electrical conversion, and when nodes are connected via a single optical cable, all of the MU 20, the HUB 30, and the RU 40 may include a wavelength division multiplexing (WDM) element. This will be clearly understood by describing functions of each RU 40 of FIG. 2 that will be described later.

Such a DAS may be connected to an external management device (a network management server or system (NMS) of FIG. 1) via a network. Thus, a manager may monitor a state and a problem of each node of the DAS in a remote manner via the NMS and may control an operation of each node in the remote manner.

Figure 2:
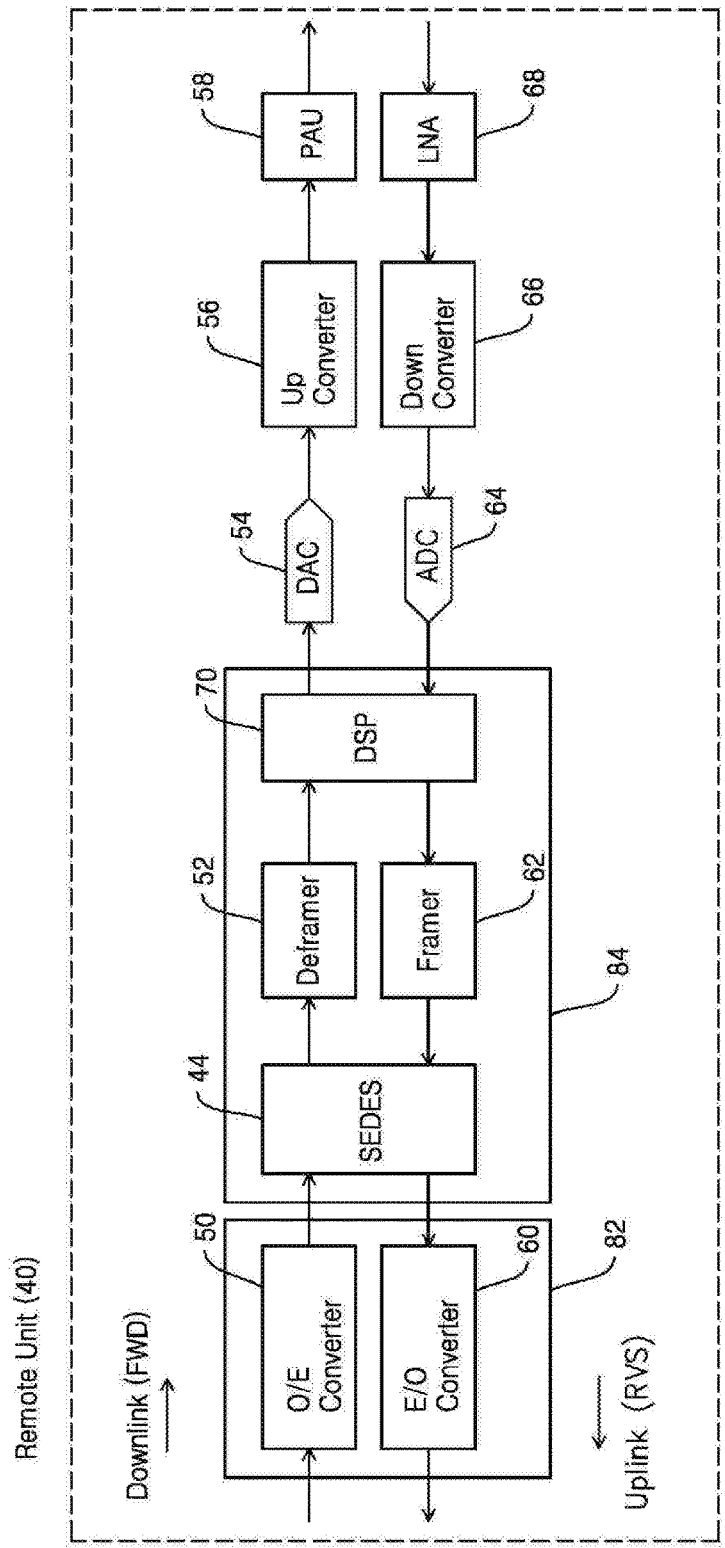
FIG. 2 is a block diagram of a remote unit in the distributed antenna system to which the present invention may be applied, according to an embodiment of the present invention.

FIG. 2 is a block diagram of a remote unit in the distributed antenna system to which the present invention may be applied, according to an embodiment of the present invention.

Here, the block diagram of FIG. 2 illustrates one embodiment of each RU 40 within the digital DAS in which connection between nodes is performed via the optical cable. The block diagram of FIG. 2 illustrates only components relating to a function of providing a service signal to a terminal within a service area via a forward path and processing a terminal signal received from the terminal within the service area via a reverse path.

In addition, here, there may be a variety of node units to which transmission delay measurement and compensation according to an embodiment of the present invention may be applied, such as a hub unit (see reference numeral 30 of FIG. 1), and a RRH in case of base station distribution in addition to a remote unit that will be described later, as described above. However, hereinafter, for conveniences and concentration of explanation, a remote unit within the DAS will be assumed and described.

Referring to FIG. 2, based on a downlink signal transmission path (i.e., a forward path), each RU 40 includes an optical to electrical converter (OEC) 50, a serializer/deserializer (SERDES) 44, a deframer 52, a digital signal processor (DSP) 70, a digital-to-analog converter (DAC) 54, an up converter 56, a power amplification unit (PAU) 58.

Thus, in the forward path, optical relay signals digitally-transmitted via the optical cable are converted into electrical signals (serial digital signals) by the OEC 50, and the serial digital signals are converted into parallel digital signals by the SERDES 44, and the parallel digital signals are reformatted by the deframer 52 so that the DSP 70 can perform processing according to frequency bands. The DSP 70 performs a function of digital signal processing, digital filtering, gain control, and digital multiplexing according to frequency bands relating to the relay signals. The digital signals that pass through the DSP 70 are converted into analog signals by the DAC 54 that constitutes an end point of a digital part 84 based on a signal transmission path. In this case, because the analog signals are IF signals, the IF signals are frequency up converted into analog signals in original RF bands thereof using the up converter 56. In this way, the analog signals converted into original RF bands thereof (i.e., the RF signals) are amplified by passing through the PAU 58 and are transmitted through a service antenna (not shown).

Based on an uplink signal transmission path (i.e., a reverse path), each RU 40 includes a low noise amplifier (LNA) 68, a down converter 66, an analog-to-digital converter (ADC) 64, a DSP 70, a framer 62, an SERDES 44, an electrical to optical converter (EOC) 60.

Thus, in the reverse path, the RF signals (i.e., terminal signals) received via the service antenna (not shown) from the user terminal (not shown) within the service coverage are low-noise amplified by the LNA 68, and the low-noise amplified RF signals are frequency down converted into IF signals by the down converter 66, and the converted IF signals are converted into digital signals by the ADC 64 and are transmitted to the DSP 70. The digital signals that pass through the DSP 70 are formatted in a format suitable for digital transmission using the framer 62, are converted into serial digital signals by the SERDES 44, are converted into optical digital signals by the EOC 60 and are transmitted to the upper stage via the optical cable.

Also, although not clearly shown in FIG. 2, when, in a state in which the RUs 40 are cascade-connected to each other, as illustrated in FIG. 1, the relay signals transmitted from the upper stage are transmitted to an adjacent RU of a cascade-connected lower stage, the following method may be applied. For example, when the optical relay signals digitally-transmitted from the upper stage are transmitted to the adjacent RU of the cascade-connected lower stage, the optical relay signals digitally-transmitted from the upper stage may be transmitted to the adjacent RU after passing through in the order of the OEC 50, the SERDES 44, the deframer 52, the framer 62, the SERDES 44, and the EOC 60. This will be clearly understood through FIG. 4 that will be described later.

In FIG. 2 described above, the SERDES 44, the deframer 52, the framer 62, and the DSP 70 may be implemented with a field programmable gate array (FPGA). Also, in FIG. 2, although the SERDES 44 and the DSP 70 are commonly used in the downlink and uplink signal transmission paths, they may be separately provided according to paths. Also, although, in FIG. 2, the OEC 50 and the EOC 60 are separately provided, they may also be implemented with a single optical transceiver module (for example, a single small form factor pluggable (SFP) module (see reference numeral 82 of FIG. 2)).

As above, topology of one type and one configuration example of an RU of the DAS have been described with reference to FIGS. 1 and 2. In particular, in FIG. 2, the RU of the digital DAS digitally-transmitted via the transport medium has been described. However, transmission delay measurement and compensation according to an embodiment of the present invention may also be applied to an analog transmission system such as the analog DAS (i.e., a DAS analog-transmitted via the transport medium), in addition to the digital DAS. Also, in case of signal distributed transmission, analog RF relay devices or digital RF relay devices may be cascade-connected to each other. In addition, transmission delay measurement and compensation according to an embodiment of the present invention may also be applied to various node connection having the relationship between a master and a slave. However, hereinafter, for conveniences and concentration of explanation, the case where transmission delay measurement and compensation according to an embodiment of the present invention are applied to the RU within the digital DAS, will be described.

Before detailed descriptions thereof (FIGS. 5 and 6), for clear understanding of transmission delay measurement and compensation according to an embodiment of the present invention, the related art compared to this will be firstly described with reference to FIG. 3.

Figure 3:
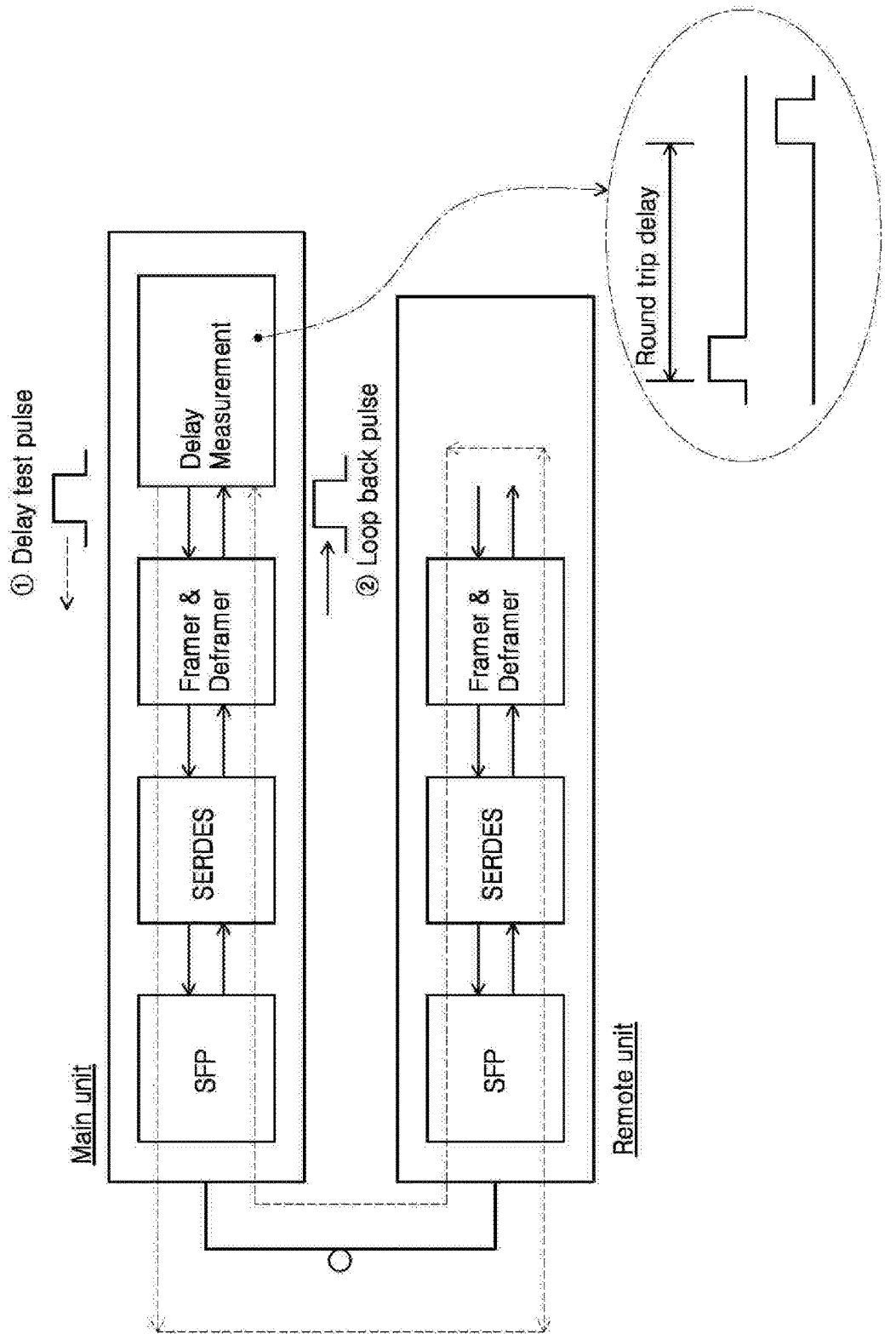
FIG. 3 is a view of a method for measuring a transmission delay of related technology compared to an embodiment of the present invention.

FIG. 3 is a view of a method for measuring a transmission delay of related technology compared to an embodiment of the present invention.

Referring to FIG. 3, in a method for measuring a transmission delay according to the related art, generally, a test pulse for measuring a delay is generated by a main unit, and the test pulse is transmitted to a remote unit of a branch-connected lower stage, and a loop back pulse that passes through the remote unit of the lower stage and is looped back, is detected, thereby measuring a transmission delay based on a time difference (i.e., see a round trip delay of FIG. 3).

When there are a plurality of remote units that are cascade-connected to each other on the same branch as that of the main unit, a method, whereby a delay measurement signal is transmitted to each remote unit from the main unit, and each delay is measured using a pulse that passes through the corresponding remote unit and is looped back, is used.

When the delay to each remote unit is measured by the above-described method, the main unit transmits a delay compensation value required to compensate for a delay in each remote unit so that delay compensation can be performed at a remote unit.

On the other hand, in an embodiment of the present invention, each node unit that is branch-connected to the main unit (i.e., a headend unit), performs only delay measurement to an adjacent node unit of the upper stage so that delay measurement or/and compensation can be performed. Hereinafter, it will be clearly understood through descriptions of FIGS. 5 and 6 that the method according to an embodiment of the present invention is different from the above-described method of FIG. 3.

Figure 4:
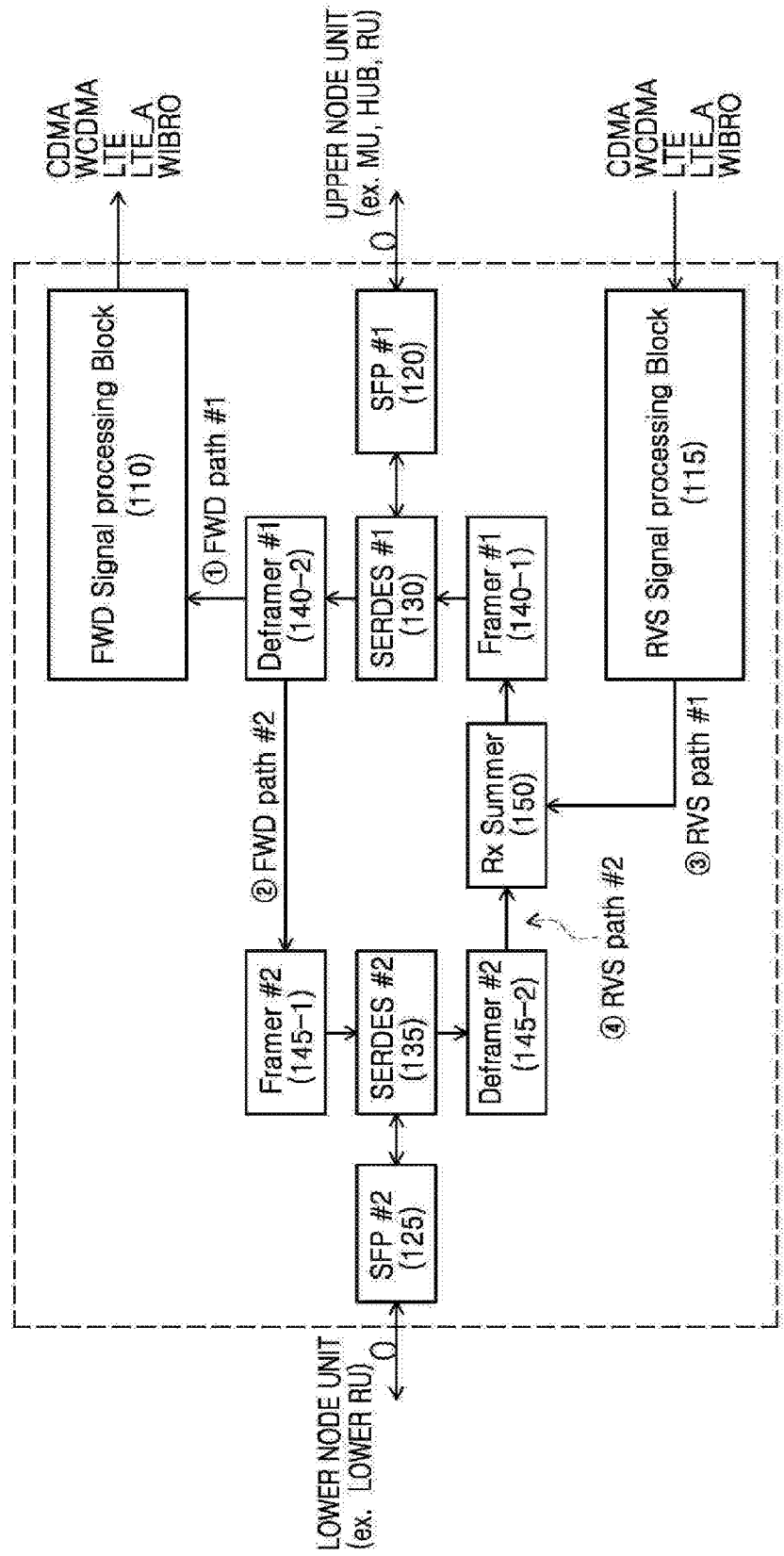
FIG. 4 is a block diagram of an example for describing an overall signal transmission path between an upper stage and a lower stage based on a particular node unit in the distributed antenna system to which the present invention may be applied.

FIG. 4 is a block diagram of an example for describing an overall signal transmission path between an upper stage and a lower stage based on a particular node unit in the distributed antenna system to which the present invention may be applied.

In FIG. 2, a component relating to a path for transmitting and receiving signals via the service antenna and functions thereof have been described before. On the other hand, FIG. 4 illustrates a component relating to a path for transmitting and receiving signals in a relationship with respect to a node unit of the upper stage or a component relating to a path for transmitting and receiving signals in a relationship with respect to a node unit of the lower stage and functions thereof.

In FIG. 4, it is assumed that the node unit is connected to node units of the upper and lower stages via the optical cable. However, as described above in FIG. 1, there may be a variety of transport medium used in connection between nodes. When the optical cable is not used, SFP modules SFP #1 120 and SFP #2 125 of FIG. 4 may be omitted. Also, in FIG. 4, it is assumed that signals are digitally-transmitted via the transport medium. However, a signal transmission method between nodes via the transport medium is not limited thereto. When not a digital transmission method but an analog transmission method is used, framers 140-1 and 145-1, deframers 140-2 and 145-2, and SERDESs 130 and 135 of FIG. 4 may also be omitted and they may be changed to other components for analog transmission. However, hereinafter, this will be described based on FIG. 4. Here, the case where the node unit of FIG. 4 is a remote unit within the DAS, will be exemplified (see FIG. 1).

In FIG. 4, a forward path #1 is a signal transmission path in which mobile communication signals transmitted from an upper stage of a corresponding remote unit are provided to a terminal within a service coverage via the service antenna. Thus, the forward path #1 of FIG. 4 is substantially the same as the forward path of FIG. 2. In case of the forward path #1, the mobile communication signals digitally-transmitted from the upper stage node via the transport medium (in the current embodiment, an optical line) are optical to electrical converted via the SFP module SFP #1 120, are converted into parallel digital signals via the SERDES #1 130, are reformatted via the deframer #1 140-2 and then are input to a forward signal processing block 110. The forward signal processing block 110 performs processing on the transmitted digital signals and then converts the digital signals into RF signals in a frequency band corresponding to original mobile communication protocols thereof and transmits the RF signals to the terminal within the service coverage via the service antenna (not shown).

In this case, when an adjacent remote unit branch-connected (i.e., cascade-connected) to the lower stage of the corresponding remote unit is present, the mobile communication signals digitally transmitted from the upper stage may be transmitted to the lower stage node via the forward path #2 of FIG. 4. The forward path #2 is a path in which the mobile communication signals digital-optically transmitted from the upper stage node are transmitted to the lower stage node unit via the transport medium after passing through the SFP module SFP #1 120, the SERDES #1 130, the deframer 140-2, the framer #2 145, the SERDES #2 135, and the SFP module SFP #2 125.

In FIG. 4, the reverse path #1 is a signal transmission path in which the mobile communication signals received from the terminal within the service area via the service antenna of the corresponding remote unit are transmitted to the upper stage (finally, to be transmitted to the base station). Thus, the reverse path #1 of FIG. 4 is substantially the same as the reverse path of FIG. 2. In case of the reverse path #1, the mobile communication signals received via the service antenna (not shown) are low-noise amplified, are frequency down converted, digitally converted, and digital signal processed via a reverse signal processing block 115 and then are input to a reverse signal summer Rx Summer 150. However, when the corresponding remote unit is a branch terminal node, the digital signals that pass through the reverse signal processing block 115 may be input directly to the framer #1 140-1.

The reverse signal summer 150 performs a function of combining the digital signals input through the reverse path #1 and the digital signals input through the reverse path #2. Here, the reverse path #2 of FIG. 4 is a signal transmission path in which, when another remote unit is present at the lower stage of the corresponding remote unit, the reverse digital signals transmitted from the lower-stage node are transmitted. The mobile communication signals digital-optically transmitted from the lower-stage node are electrical to optical converted by the SFP module SFP #2 125, pass through the SERDES #2 135 and the deframer #2 145-2 and are input to the reverse signal summer 150.

As described above, the reverse digital signals summed by the reverse signal summer 150 are transmitted to the upper stage via the transport medium after passing through the framer #1 140-1, the SERDES #1 130, and the SFP module SFP #1 120. These reverse digital signals will be finally transmitted to the base station.

Hereinafter, for conveniences of explanation, in FIG. 4, the framer #1 140-1, the deframer #1 140-2, the SERDES #1 130, and the SFP module SFP #1 120 are components relating to the signal transmission path of signals to be received from the upper stage node or to be transmitted to the upper stage node and thus are referred to as "interface components at the upper stage". Similarly, in FIG. 4, the framer #2 145-1, the deframer #2 145-2, the SERDES #2 135, and the SFP module SFP #2 125 are components relating to the signal transmission path of signals to be received from the lower stage node or to be transmitted to the lower stage node and thus are referred to as "interface components at the lower stage".

Figure 5:
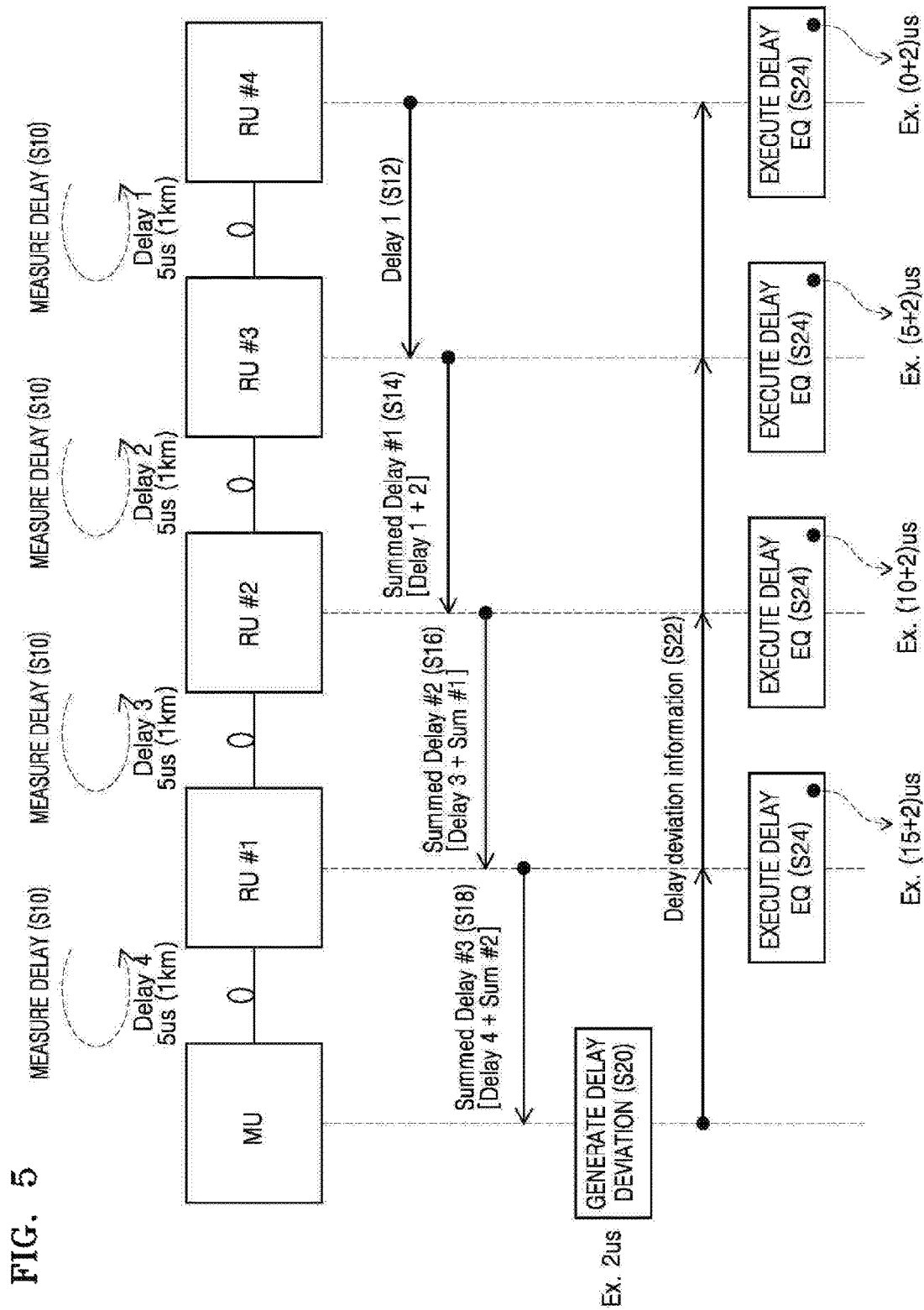
FIG. 5 is a view for generally describing a method for measuring and compensating for a transmission delay according to an embodiment of the present invention.
Figure 6:
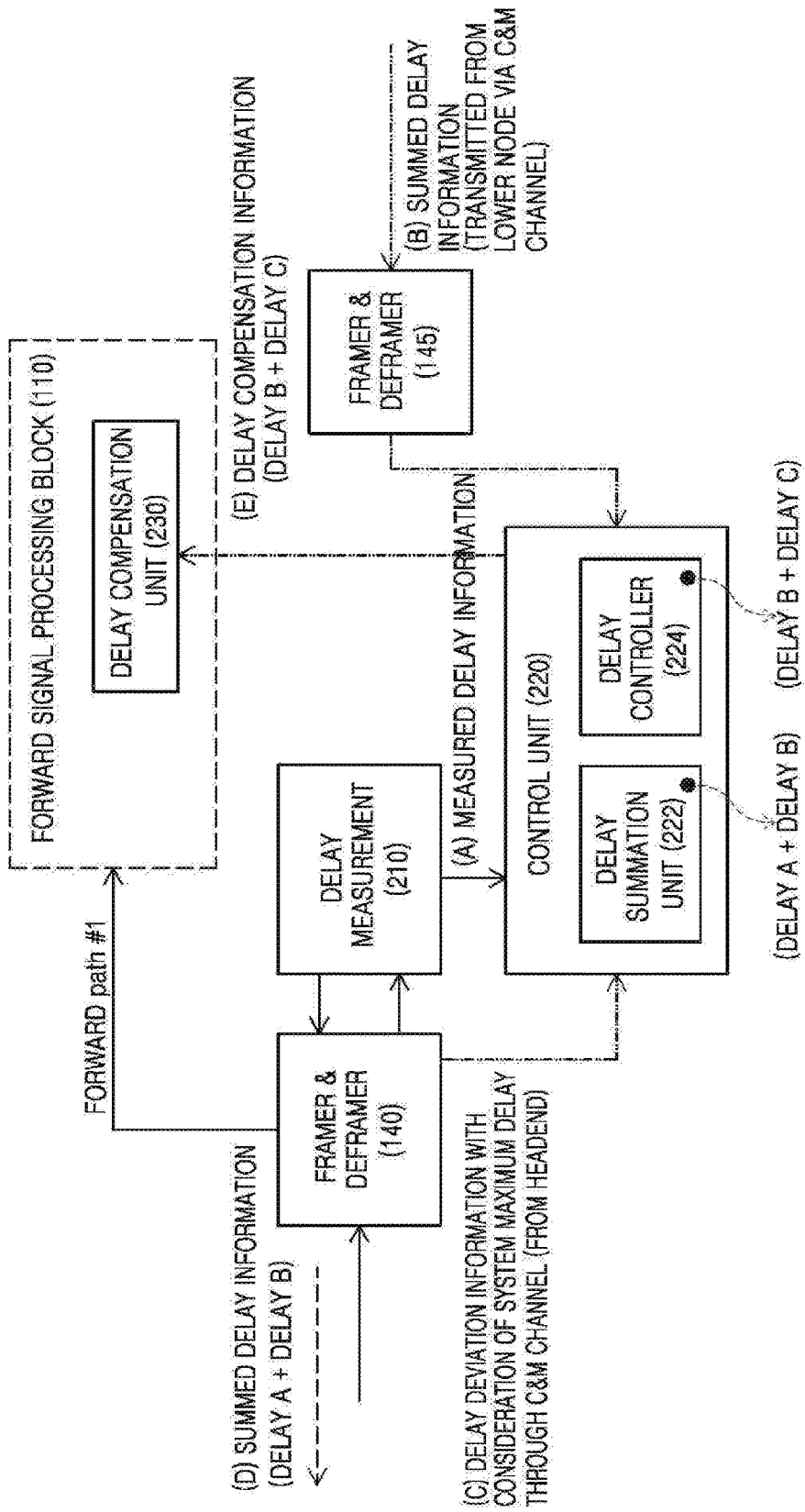
FIG. 6 is a block diagram of a related configuration in any one node unit for implementing the method for measuring and compensating for the transmission delay according to an embodiment of the present invention.

Although this will be clearly understood through descriptions of FIGS. 5 and 6, in case of digital optical transmission, for delay measurement, the interface components at the upper stage (i.e., the framer #1 140-1, the deframer #1 140-2, the SERDES #1 130, and the SFP module SFP #1 120) are involved in signal transmission of test signals to be transmitted from the corresponding node unit to the upper stage node and to be loop backed.

FIG. 5 is a view for generally describing a method for measuring and compensating for a transmission delay according to an embodiment of the present invention, and FIG. 6 is a block diagram of a related configuration in any one node unit for implementing the method for measuring and compensating for the transmission delay according to an embodiment of the present invention.

Hereinafter, a method for measuring and compensating for a transmission delay according to an embodiment of the present invention will be described with reference to FIGS. 5 and 6. Here, in FIG. 5, it is assumed that a total number of four RUs as particular branches of an MU that is a headend unit are cascade-connected to one another. For example, a total number of four RUs of FIG. 5 may be matched to a plurality of RUs disposed in Branch #1 or Branch #N of FIG. 1, and for conveniences of explanation, hereinafter, it is assumed that the total number of four RUs of FIG. 5 are RUs of Branch #1.

Referring to Operation S10 of FIG. 5, a transmission delay via the transport medium between adjacent node units of the upper stage is measured by RU #1 to RU #4.

In FIG. 5, in Operation S10, the RUs perform measurement of the transmission delay between the adjacent nodes of the upper stage in the same time. However, transmission delay measurement of the RUs may be performed in the same time or may also be sequentially performed according to implementation methods.

For example, delay measurement of the RUs may start according to a delay measurement start signal transmitted from the headend unit (see an MU of FIG. 5) or the NMS of FIG. 1. In this case, transmission delay measurement may also be sequentially performed in a reverse order from RU #4 that constitutes an end point of the corresponding branch to RU #1.

In this case, the delay measurement start signal from the headend unit or the NMS may be simultaneously or sequentially transmitted to each RU via one among a control & management (C&M) channel, a downlink overhead channel, and a downlink frame field. Alternatively, transmission of the delay measurement start signal from the headend unit or the NMS may be performed by only a node unit (RU #1 of FIG. 5) constituting a start point of the branch or a node unit (RU #4 of FIG. 5) constituting an end point of the branch, and the delay measurement start signal may also be sequentially transmitted to an adjacent node unit in a forward or reverse order. In the above embodiment, the delay measurement start signal is firstly generated from the headend unit or the NMS and is transmitted to the lower stage. However, of course, other modifications may be present. For example, it may be pre-set that delay measurement starts at the corresponding node unit in a particular time, and delay measurement at the corresponding node unit may also start according to site worker's control.

The following method may be used in transmission delay measurement at each RU in Operation S10. This will be described with reference to FIG. 6. Referring to FIG. 6, each node unit for performing transmission delay measurement and compensation according to an embodiment of the present invention includes a delay measurement unit 210, a delay summation unit 222, a delay controller 224, and a delay compensation unit 230. Here, the delay summation unit 222 and the delay controller 224 may be implemented within a control unit 220. In case of digital transmission via the transport medium, the above components may be implemented by a digital part within the corresponding node unit and may be implemented within a single FPGA. Of course, it will be understood by one of skilled in the art that other modifications are present.

For delay measurement according to an embodiment of the present invention, the delay measurement unit 210 transmits a test signal for delay measurement to the adjacent node unit of the upper stage branch-connected to the corresponding node unit (for example, when the corresponding node unit is RU #1, an MU that is a headend unit, and when the corresponding node unit is RU #2, RU #1 that is the upper stage node).

In this case, the test signal for delay measurement may be a test pulse that is a single pulse or a test pulse having a particular bit pattern, and an encoded modulation signal corresponding to a mobile communication signal to be actually provided (i.e., emulating the mobile communication signal) may also be used as the test signal for delay measurement. In an example, because, in particular, service time synchronization is significant in an OFDM-based signal, a test signal emulating the corresponding OFDM-based signals (e.g. long term evolution (LTE), wireless broadband Internet (WIBRO), etc.) of which delay measurement is required, may be used. Also, the test signal is loaded in a usage frequency band of the corresponding mobile communication service and is transmitted to the upper stage and thus may also be used to measure a transmission delay via the transport medium according to a corresponding service frequency band.

Here, the delay measurement unit 210 measures a transmission delay specialized in the transport medium (or/and an interface component on a signal transmission path for signal transmission via the transport medium), such as characteristics of the transport medium, an installation length, and an installation path. Because digital optical transmission is illustrated in FIG. 5, the interface component for performing signal transmission via the corresponding transport medium (in FIG. 5, an optical cable) may be an SFP module, an SERDES, a framer, and a deframer (see descriptions of FIG. 4). Thus, in FIG. 6, the delay measurement unit 210 is disposed at a rear end of the framer/deframer 140 that constitutes an end point of the interface component with respect to the upper stage. However, the position of arrangement of the delay measurement unit 210 may be modified in various ways.

The test signal transmitted to the upper stage node by the delay measurement unit 210 passes through the framer/deframer 140 of the upper stage node via the transport medium and is looped back to the corresponding node unit. The delay measurement unit 210 detects the looped back signal (hereinafter, referred to as a loop back signal), thereby measuring a transmission delay between the upper stage node and the corresponding node unit (see (A) Measured delay information of FIG. 6). That is, the delay measurement unit 210 may measure a round trip delay caused by a loop back path between the upper stage node and the corresponding node unit firstly and may calculate a transmission delay caused by a transport medium between the upper stage node and the corresponding node unit.

Because, in general, the round trip delay is measured at a time at which a round trip to the transport medium is performed, a real signal transmission delay via the transport medium may be approximately ½ of the round trip delay. However, because a method of calculating a real transmission delay from the round trip delay will be statistically or mathematically determined by a system designer by including various additional considerations, in the present specification, detailed descriptions thereof will be out of the question. In FIG. 5, it is assumed that all of transmission delays caused by the transport medium between adjacent nodes measured by RUs are the same of 5 us.

Referring to Operation S12 of FIG. 5, as described above, after transmission delay measurement is performed, RU #4 that is a node that constitutes an end point of the corresponding branch transmits self-measured transmission delay information (i.e., see Delay 1 that is a transmission delay caused by the transport medium between RU #4 and RU #3, and in the current embodiment, 5 us) to RU #3 that is an upper adjacent node of RU #4.

When the transmission delay information is received from RU #4, RU #3 sums the self-measured transmission delay (i.e., as transmission delay information measured by the delay measurement unit of RU #3, see Delay 2 that is a transmission delay caused by the transport medium between RU #3 and RU #2 that is an upper adjacent node of RU #3, and in the current embodiment, 5 us) and a transmission delay transmitted from RU #4 (see Delay 1 of FIG. 5). In Operation S14 of FIG. 5, the summed delay information (hereinafter, summed delay information)(see Summed Delay #1 of FIG. 5, and in the current embodiment, 10 us) is transmitted to RU #2 that is the adjacent node of the upper stage of RU #3.

The above-described procedure is repeatedly carried out in Operations S16 and S18 of FIG. 5. That is, when the summed delay information (see Sum #1 of FIG. 5, 10 us) is received from RU #3, RU #2 transmits new (accumulated) summed delay information (see Summed Delay #2 of FIG. 5, and in the current embodiment, 15 us) that is obtained by summing the self-measured transmission delay information (see Delay 3 of FIG. 5, and in the current embodiment, 5 us) and the summed delay information transmitted from RU #3 (i.e., Sum #1) to RU #1 that is an upper adjacent node of RU #2.

Thus, RU #1 that is a node that constitutes a start end of the corresponding branch, transmits new summed delay information (see Summed Delay #3 of FIG. 5, and in the current embodiment, 20 us) that is obtained by summing the self-measured transmission delay information (see Delay 4 of FIG. 5, and in the current embodiment, 5 us) and the summed delay information (i.e., Sum #2, 15 us) transmitted from RU #2 to a headend unit MU that is an upper adjacent node of RU #1.

Through the above-described procedure, the headend unit MU may recognize a transmission delay (in the embodiment of FIG. 5, 20 us) of the entire branch via the transport medium to an end point of the corresponding branch. Related configurations in each RU for implementing the above-described Operations S12 to S18 will be described with reference to FIG. 6 as below.

In the embodiment of the present invention, generation of the summed delay information may be performed by the delay summation unit 222. Referring to FIG. 6, when a transmission delay measured by the corresponding node (i.e., a transmission delay caused by the transport medium between the upper stage node and the corresponding node) is Delay A and summed delay information received from an adjacent node of the lower stage via the framer/deframer 145 of an end point of the interface configuration unit of the lower stage is Delay B, the delay summation unit 222 of the corresponding node generates accumulated summed delay information (i.e., Delay A+Delay B) that is obtained by summing the two delays.

If the corresponding node unit is a node unit that constitutes an end point of the corresponding branch, no adjacent node of the lower stage is present. Thus, no summed delay information transmitted from the adjacent node of the lower stage will be present. In this case, the delay summation unit 222 may generate summed delay information only with the self-measured transmission delay (i.e., Delay A).

As described above, when the summed delay information is newly generated by the delay summation unit 222, the control unit 220 transmits the generated summed delay information to the adjacent node of the upper stage. In this case, the summed delay information may be transmitted to the adjacent node of the upper stage via one among a C&M channel, an uplink overhead channel, and an uplink frame field.

In Operation S20 of FIG. 5, the headend unit MU generates delay deviation information. Here, the delay deviation information may be, for example, in a node distribution environment of the DAS as illustrated in FIG. 1, information relating to a difference between a maximum transmission delay in the entire node distribution environment and a maximum transmission delay in the corresponding branch.

For example, when the branch illustrated in FIG. 5 is Branch #1 of FIG. 1, a transmission delay in the entire corresponding branch that was checked before, was 20 us. If 20 us that is the entire transmission delay in the corresponding branch is a maximum value corresponding to a longest transmission delay on the topology of FIG. 1, the delay deviation information may be 0. On the other hand, when the entire transmission delay at Branch #k on the topology of FIG. 1 is the longest transmission delay in the entire system, the delay deviation information may be present. In an example, when it is assumed that the entire transmission delay at Branch #k is 22 us, the delay deviation information may be determined as 2 us, as illustrated in FIG. 5 in consideration of the maximum transmission delay in the entire system. Thus, the delay deviation information generated by the headend unit MU may be differently determined according to a branch.

When the delay deviation information is generated in Operation S20, the headend unit MU transmits the delay deviation information to each RU in the corresponding branch (see Operation S22 of FIG. 5). In this case, the delay deviation information may be transmitted to each RU in the corresponding branch via one of the C&M channel, the downlink overhead channel, and the downlink frame field, similarly to the above description.

Thus, each RU performs delay compensation by referring to the delay deviation information transmitted from the headend unit MU (see S24 of FIG. 5). This will be described with reference to FIG. 6 as below.

When the delay deviation information is received from the headend unit MU, the delay controller 224 sums the receive delay deviation information (see Delay C of FIG. 6) and the summed delay information (see Delay B of FIG. 6) received from the above-described lower stage, thereby calculating a compensation value (i.e., for delay equalization using the delay compensation unit 230). Of course, if the delay deviation information is 0, it is obvious that the delay controller 224 may also generate only a compensation value as much as the summed delay information received from the lower stage.

If the delay compensation value is calculated as above, the delay controller 224 transmits the delay compensation value to the delay compensation unit 230. Thus, the delay compensation unit 230 may perform delay compensation for equalizing a delay in the entire system in a node distribution environment, such as a DAS, by referring to the transmitted delay compensation value.

For example, in FIG. 5, in case of RU #4, only delay compensation as much as the delay deviation information (in FIG. 5, 2 us) is performed, and in case of RU #1 to RU #3, delay compensation as much as the sum of the delay deviation information and the lower stage transmission delay information (15 us, 10 us, 5 us, respectively) will be performed.

In this case, although delay compensation using the delay compensation unit 230 may be uniformly applied to the entire mobile communication signals to be served, as described above, delay compensation using the delay compensation unit 230 may also be selectively performed only on service signals of which delay compensation is particularly significant, as OFDM-based signals. This will be determined by the system designer. Also, although, in FIG. 6, for conveniences of illustration of the drawings, delay compensation using the delay compensation unit 230 is applied only to the forward path (see reference numeral 110 of FIG. 6), the above-described delay compensation may be applied to the reverse path in the same or similar way. This is because, even in the reverse path, synchronization between signals of several terminals is required to be performed for processing at the base station.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A node unit which is connected to at least one other node unit via a transport medium, the node unit comprising:
   a delay measurement unit which transmits a test signal for measuring a delay to an upper adjacent node unit via the transport medium and detects a loop back signal to which the test signal is looped back via the upper adjacent node unit, thereby measuring an upper transmission delay between the upper adjacent node unit and the node unit;
   a delay summation unit which, when a lower adjacent node unit exists, receives a lower transmission delay transmitted from the lower adjacent node unit, and calculates a summed transmission delay by summing the upper transmission delay and the lower transmission delay;

a control unit which transmits the summed transmission delay to the upper adjacent node unit, and calculates a compensation value for equalization of the summed transmission delay based on delay deviation information transmitted from a headend unit; and a delay compensation unit which performs delay compensation for equalizing a transmission delay of an entire node distribution environment of a distributed antenna system based on the compensation value, wherein the control unit calculates the compensation value based on delay deviation information transmitted from the headend unit, the delay deviation information corresponding to a difference between a maximum transmission delay in the entire node distribution environment of the distributed antenna system and a maximum transmission delay in a branch including a corresponding node unit.

2. The node unit of claim 1, wherein, when the lower adjacent node unit is a node unit that constitutes an end point within a same branch, the lower transmission delay received from the lower adjacent node unit is a transmission delay between the lower adjacent node unit and the node unit.

3. The node unit of claim 1, wherein, when at least one other lower adjacent node unit connected to the lower adjacent node unit exists, the lower transmission delay received from the lower adjacent node unit is a delay in which a transmission delay between the lower adjacent node unit and the node unit and a transmission delay from the lower adjacent node unit to an end point node unit of the at least one other lower adjacent node unit are summed.

4. The node unit of claim 1, wherein the node unit is connected to the headend unit, wherein the headend unit constitutes the distributed antenna system and constitutes a start point for interfacing mobile communication service signals between a base station and the node unit.

5. The node unit of claim 4, further comprising, when the distributed antenna system is a digital signal distributed system in which the mobile communication service signals are digitally transmitted between nodes via the transport medium, a framer/deframer disposed on a signal transmission path with the upper adjacent node unit, and the delay measurement unit is disposed at a rear end of the framer/deframer on a loop back path with the upper adjacent node unit, transmits the test signal to the upper adjacent node unit via the framer, and detects the loop back signal with respect to the test signal transmitted via the deframer.

6. The node unit of claim 4, wherein the lower transmission delay is transmitted from the lower adjacent node unit via one among a control & management (C&M) channel, an uplink overhead channel, and an uplink frame field of a mobile communication signal of the distributed antenna system.

7. The node unit of claim 4, wherein the control unit calculates the compensation value for equalization of the summed transmission delay based on the lower transmission delay and transmits the calculated compensation value to the delay compensation unit.

8. The node unit of claim 4, wherein the control unit receives delay deviation information transmitted from the headend unit, calculates the compensation value for equalization of the summed transmission delay based on the delay deviation information, and transmits the calculated compensation value to the delay compensation unit.

9. The node unit of claim 8, wherein the control unit sums the delay deviation information and the lower transmission delay to calculate the compensation value for equalization of the summed transmission delay and transmits the calculated compensation value to the delay compensation unit.

10. The node unit of claim 8, wherein the delay deviation information is transmitted from the headend unit via one among a C&M channel, downlink overhead channel, and a downlink frame field of a mobile communication signal of the distributed antenna system.

11. The node unit of claim 4, wherein the control unit receives a delay measurement start signal from a network management system connected to the headend unit or the distributed antenna system via a network and controls the node unit to start transmission delay measurement using the delay measurement unit in response to the received delay measurement start signal.

12. A distributed antenna system comprising: a headend unit; and a plurality of node units connected to the headend unit, wherein each of the plurality of node units comprises:

a delay measurement unit which transmits a test signal for measuring a delay to an upper adjacent node unit via a transport medium and detects a loop back signal to which the test signal is looped back via the upper adjacent node unit, thereby measuring an upper transmission delay between the upper adjacent node unit and the node unit;

a delay summation unit which, when a lower adjacent node unit exists, receives a lower stage transmission delay transmitted from the lower adjacent node unit, and calculates a summed transmission delay by summing the upper transmission delay and the lower transmission delay;

a control unit which transmits the summed transmission delay to the upper adjacent node unit, and calculates a compensation value for equalization of the summed transmission delay based on delay deviation information transmitted from the headend unit; and a delay compensation unit performing delay compensation for equalizing a transmission delay of an entire node distribution environment of the distributed antenna system based on the compensation value, wherein the control unit calculates the compensation value based on delay deviation information transmitted from the headend unit, the delay deviation information corresponding to a difference between a maximum transmission delay in the entire node distribution environment of the distributed antenna system and a maximum transmission delay in a branch including a corresponding node unit.

13. The distributed antenna system of claim 12, further comprising, when the distributed antenna system is a digital signal distributed system in which a mobile communication service signal is digitally transmitted between nodes via a transport medium, a framer/deframer disposed on a signal transmission path with the upper adjacent node unit, wherein the delay measurement unit is disposed at a rear end of the framer/deframer on a loop back path with the upper adjacent node unit, transmits the test signal to the upper adjacent node unit via the framer/deframer, and detects the loop back signal with respect to the test signal transmitted via the framer/deframer.

14. The distributed antenna system of claim 12, wherein the control unit calculates the compensation value for equalization of the summed transmission delay based on the lower transmission delay and transmits the calculated compensation value to the delay compensation unit.

15. The distributed antenna system of claim 12, wherein the control unit calculates the compensation value for equalization of the summed transmission delay based on the delay deviation information.

16. The distributed antenna system of claim 12, wherein the control unit receives a delay measurement start signal from a network management system connected to the head-end unit or the distributed antenna system via a network and controls the node unit to start transmission delay measurement using the delay measurement unit according to the received delay measurement start signal.

* * * * *